United States Patent [19]

Jones

[11] Patent Number: 5,102,537
[45] Date of Patent: Apr. 7, 1992

[54] PIPING OUTLET PROTECTOR

[76] Inventor: Joseph R. Jones, Rte. 2, Box 80, Rochelle, Ga. 31079

[21] Appl. No.: 584,091

[22] Filed: Sep. 18, 1990

[51] Int. Cl.$^5$ .............................................. E04B 1/72
[52] U.S. Cl. ................... 210/162; 210/153; 210/154; 210/163; 210/166; 52/101; 138/96 R; 405/42
[58] Field of Search ............... 210/153, 154, 155, 162, 210/163, 166, 170, 460, 463, 747; 43/45, 47; 52/101; 405/40, 41, 127; 138/96 T, 96 R; 4/343

[56] References Cited

U.S. PATENT DOCUMENTS

| | | | |
|---|---|---|---|
| 748,201 | 12/1903 | Miller | 43/64 |
| 830,112 | 9/1906 | Tenold | 210/131 |
| 928,481 | 7/1909 | Tenold | 210/131 |
| 961,834 | 6/1910 | Barlett | 210/446 |
| 3,289,846 | 12/1966 | Kahn | 210/131 |
| 3,585,646 | 9/1968 | Lopez | 4/343 |
| 4,356,087 | 10/1982 | Miles | 210/131 |
| 4,702,828 | 10/1987 | Mehmert et al. | 210/131 |
| 4,748,788 | 6/1988 | Rafter | 52/101 |

FOREIGN PATENT DOCUMENTS 830784 12/1937 France .
890958 4/1989 PCT Int'l Appl. .

Primary Examiner—Robert A. Dawson
Assistant Examiner—David Reifsnyder
Attorney, Agent, or Firm—Mason, Fenwick & Lawrence

[57] ABSTRACT

An elongated, conical cage of spaced-apart rods is disclosed, each rod having a first and secured to the apex of the cone, and a second end terminating in the open of the cone which is formed by a circular ring-shaped rod. The open end of the conical cage and the circular rod forming the open end are secured to a band preferably constructed of metal which forms a fixation device for securement to the exposed end of the pipe. Preferably, the rods forming the conical cage are spaced apart by approximately six inches, a distance which has been found sufficiently wide to enable debris to flow through and out of the apparatus, and sufficiently narrow to prevent entry of small animals such as beavers into the apparatus. The elongated concial cage of rods forming part of the present invention is preferably constructed approximately six feet long, a distance which has been found sufficiently long to enable large twigs, branches, and other debris flow smoothly out of the device without becoming jammed within it or against the interior of the apex of the conical cage. The position of the rods will cause the sticks which block the pipes to turn inward under pressure of water flow and thus permit passage of the sticks and refuse thorugh the pipe. The device thus allows an unrestricted flow of water through outdoor drainage piping by preventing debris, trash and animals such as beavers from stopping up the pipes.

11 Claims, 1 Drawing Sheet

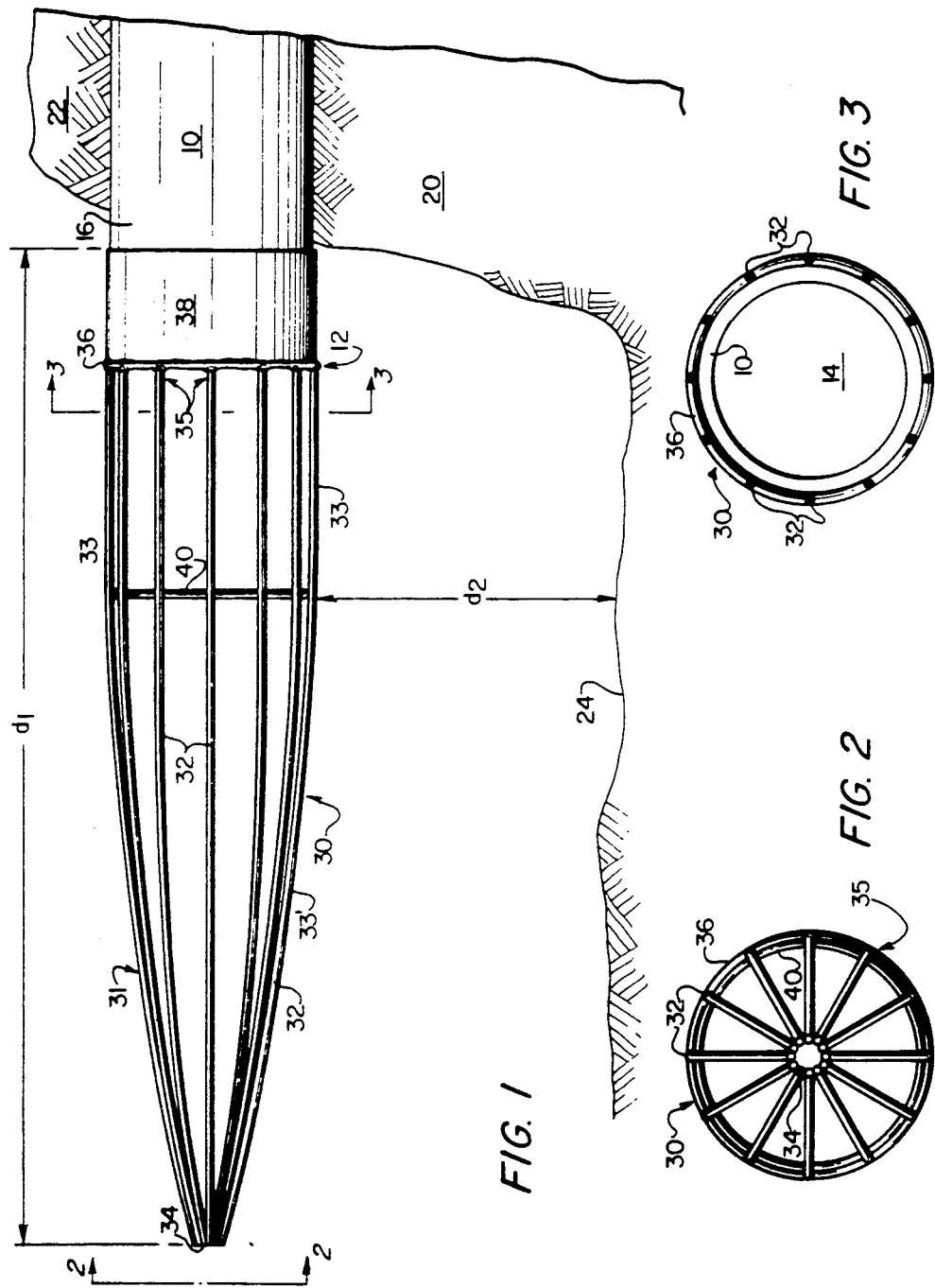

PIPING OUTLET PROTECTOR

BACKGROUND OF THE INVENTION

1. Field of the Invention

The present invention relates to outlet protection apparatus for preventing debris from clogging the exposed end of suey, drainage or irrigation pipe, and for simultaneously preventing entry into the pipe of small animals such as beavers. The present invention specifically relates to elongated piping outlet protectors which permit accumulated debris to flush through and out the protector, while simultaneously preventing entry of small animals into the pipe.

2. Prior Art

Large-diameter piping is often used to direct the flow of rainwater under roads and away from lands sensitive to oversaturation by water such as agricultural fields. Typically such piping is buried in natural soil and terminates in one open end which directs water flow into a drainage ditch, reservoir, or natural stream. In some cases piping directs the flow of water under a roadway and includes two open ends, one on each side of the road.

This type of drainage piping is highly useful but suffers from two main drawbacks. First, during storms and other intense weather activity, large debris may be washed into the piping and may become jammed in the pipe. Second, the open end of drainage piping attracts water-seeking animals; some particularly industrious animals such as beavers commonly construct dams across one open end of the piping, blocking the piping, backing up water and thereby creating a pond on the other end.

To overcome these disadvantages several devices have been developed for preventing animals from gaining access to drain pipes while allowing water and debris to flow out of the drain. For example, U.S. Pat. No. 830,112 (Tenold) shows a drain tile and pipe protector for a pipe comprising a generally square end box fitted with a downwardly angled filter grate which is drilled with a plurality of small holes. The grate is mounted a hinge pin enabling the grate to be selectively raised or lowered.

A similar invention is provided in U.S. Pat. No. 928,481 (Tenold), which shows a more elaborate angled gate for the end of a pipe which includes an interior grate connected to a pivot arm and a movement arm. The gate may be raised or lowered from the exterior of the grate housing by moving the protruding end of lever.

U.S. Pat. No. 961,834 (Barlett) shows an animal guard for pipes consisting of two symmetrically identical doors each having a plurality of elongated vertical channels through which debris or water may flow. The doors are secured to a pipe end fitting using hinges. Further, the doors are prevented from moving inward by springs secured to the interior of the pipe using hooks.

The device in U.S. Pat. No. 3,289,840 (Kahn) prevents small animals from gaining access to drain pipes by providing a pivotable gate which remains closed and is manually cleaned to remove built up debris.

U.S. Pat. No. 4,356,087 (Miles) also shows a gate which is mounted within the open end of the drain pipe and remains in a closed position to prevent small animals from gaining access to the drain pipe. The flow of drain pipe water containing debris results in the gate pivoting open to allow the debris to flow out of the drain pipe.

U.S. Pat. No. 4,702,828 (Mehmert) improves on the previous patents by providing a plurality of rotatable prongs that are self cleaning. In addition, it includes a tamper proof guard which keeps more intelligent animals such as raccoons from opening the gate.

The prior art does not appear to completely solve the problems overcome by the present invention. For example, the two patents to Tenold include a movable, hinged door having plural small holes, but the holes are too small to allow large debris to pass through. Additionally, there is no indication that small animals, particularly intelligent animals such beavers, could not devise a way to force the doors of Tenold shut by piling debris against them.

The patent to Kahn shows a drainage pipe cover which could be fouled by large, elongated material such as sticks which become lodged perpendicular to the pipes which prevent animals from entering the Kahn device. The Kahn device is directed to preventing rodents from entering drain pipes, but is not designed to prevent animals such as beavers from piling debris against the device.

The Barlett device shares the disadvantage of Kahn in that the Barlett covers could be fouled by long materials such as sticks becoming horizontally lodged against the door, without providing sufficient force to open the doors. It is also possible that the doors of Barlett could become partially opened and stuck in the open position by the discharge of large amounts of bulk material. Further, since the doors of Barlett open only one way, beavers or similar animals could easily foul the device by piling debris against the doors and preventing them from moving outward.

The patents to Mehmert et al. and Miles represent more modern, complex applications of the same principles shown in the prior patents. Both Mehmert and Miles show rotatable spike-like devices which have sharp, outwardly-facing spikes to prevent animals from entering, but which rotate under water flow pressure to enable large debris to spin through the devices. However, it is quite conceivable that a beaver or similar animal could pile enough debris against the drain pipe and guard to render it useless. Further, the present invention is far more simple than the Mehmert et al. and Miles devices, and consequently shares an economic advantage over these patents.

Thus, the prior art appears deficient in not providing a drainage or irrigation pipe protection device which simultaneously prevents small animals from building dams in the device or entering the pipe, and yet simultaneously permits debris to flow through and out the device without clogging it. Accordingly, those skilled in the art would find useful an elongated pipe outlet protection apparatus overcoming the above advantages. Those skilled in the art would find particularly useful an elongated, ogive or cone-shaped front grate for a pipe which both prevents animals from entering the pipe and permits large debris such as sticks to pass through the grate unimpeded.

SUMMARY OF THE INVENTION

The present invention relates to a device which allows an unrestricted flow of water through outdoor drainage piping by preventing debris, trash and animals such as beavers from stopping up the pipes. The device is attached to the end of a drainage pipe and consists of a closed conical cage of steel rods placed six inches apart. The position of the rods will cause the sticks which block the pipes to turn inward under pressure of water flow and thus permit passage of the sticks and refuse through the pipe.

The disadvantages of the prior art are overcome through provision of an elongated, conical cage of spaced-apart rods, each rod having a first end secured to the apex of the cone, and a second end terminating in the open of the cone which is formed by a circular ring-shaped rod. The open end of the conical cage and the circular rod forming the open end, are secured to a band preferably constructed of metal which forms a fixation device for securement to the exposed end of the pipe. Preferably, the rods forming the conical cage are spaced apart by approximately six inches, a distance which has been found sufficiently wide to enable debris to flow through and out of the apparatus, and sufficiently narrow to prevent entry of small animals such as beavers into the apparatus.

The elongated conical cage of rods forming part of the present invention is preferably constructed approximately six feet long, a distance which has been found sufficiently long to enable large twigs, branches, and other debris flow smoothly out of the device without becoming jammed within it or against the interior of the apex of the conical cage.

One goal of the present invention is to provide an outlet protector for the exposed end of irrigation or other drainage piping which is simple to install and easily fabricated of readily-available materials.

A further object of the present invention is to provide an outlet protector for piping which permits large debris to flow through and out the device while simultaneously preventing clogging of the device by small industrious animals such as beavers, and preventing entry of such animals into the pipe.

Yet another object of the present invention is to provide an elongated outlet protector device for piping which is adaptable to piping of different diameters and different geographical or physical locations.

BRIEF DESCRIPTION OF THE DRAWINGS

FIG. 1 is a side elevation view of an outlet protector according to the present invention shown attached to the exposed end of piping protruding from surrounding earth.

FIG. 2 is front elevation view of the outlet protector of FIG. 1.

FIG. 3 is a section view taken along line 3—3 of FIG. 1.

DETAILED DESCRIPTION OF THE PREFERRED EMBODIMENTS

In the discussion which follows specific terminology is used for the sake of clarity. However, the applicant intends, and the reader should understand, that the present invention is not limited to the terms selected, but rather the invention includes all technical equivalents operating in substantially similar fashion to achieve substantially similar purposes in a substantially similar way.

Referring now to the preferred embodiment of the invention shown in FIGS. 1 through 3, and referring specifically to FIG. 1, a section of irrigation or drainage piping 10 is shown buried in a soil substrate 20. Piping 10 comprises any type of irrigation or drainage piping commonly used to channel water underneath roadways, buildings, and away from areas sensitive to collection of excessive water such as agricultural fields. Piping 10 may be constructed of cast or poured concrete, steel, cast iron, or any other suitable material for outdoor piping.

In a typical drainage pipe configuration, the pipe 10 is buried beneath a soil layer 22 directly beneath a roadway (not shown). In such a case pipe 10 may have one exposed end 12 terminating on one side of the road and a second exposed end (not shown) terminating on the other side of the road. Alternatively, the second end of the piping may connect to further piping segments, a storm drain system, or another origination point.

FIG. 1 further indicates that pipe 10 includes an outer wall 16 and an exposed end 12 to which is affixed an outlet protector device 30 according to the present invention.

As shown in FIGS. 1 and 2 the outlet protector 30 comprises an elongated conical cage 31 of plural bars 32 which are preferably constructed of steel. Each bar 32 is elongated steel bar of a round cross-sectional shape. Bars 32 are constructed of steel bar having a cross-sectional size sufficient to provide structural strength and resist exposure to the elements, and a preferable cross-section size is $\frac{1}{2}''$ to $2\frac{1}{2}''$.

The bars 32 each include a relatively straight section 33 and an inwardly-curved section 33'. The inwardly-curving section 33' of each bar 32 terminates at one end in an end weldment 34, which weldment 34 forms the apex of the conical cage 31. An interior circular retaining bar 40 is provided to help maintain the circular shape of the device, as shown in FIG. 2. The inward curvature of the bars 32 begins at a point just forward of the retaining bar 40.

The open end of the conical cage 31 of the apparatus 30 terminates in a circular end ring bar 36 shown in FIGS. 1, 2, and 3. The ends 35 of straight section 33 of bars 32 are each secured to the ring 36 using suitable affixation means such as welding. The retainer bar 40 is also welded to the exterior surface of the inboard side of bars 32, such that the bar 40 forms a circle disposed within the cage 31 of bars 32.

A relatively wide band 38, preferably manufactured of sheet steel, is provided and forms affixation means for securing the conical cage 31 of bars 32 to the exposed end 12 of pipe 10. The band 38 is formed in a circle and welded or affixed with any other appropriate means to end ring bar 36.

To install the apparatus 30 on a pipe 10, the band 38 is force-fitted over the exposed end 12 of the pipe 10. Band 38 is therefore constructed having a diameter only slightly larger than the diameter of exterior wall 16 of pipe 10, to insure a reliable and tight fit. The band 38 may be affixed in place using any suitable means such as bolts, construction adhesive, or friction affixation.

An outlet protector device 30 according to the present invention has an overall end-to-end length of d1 as shown in FIG. 1. In practice, distance d1 is preferably approximately 6 feet. However, the invention may be practiced in other lengths d1 depending on many factors, one of which is the strength of the water flow through the pipe 10 in a particular location. Another factor is the type of debris common to the area in which the device 30 is installed. In geographical locations where pipes 10 are not ordinarily clogged with long debris such as twigs, pine needles or tree ranches, the device 30 may be constructed having a shorter dimension d1 such as 3 or 4 feet.

The device 30 is preferably separated from surrounding soil 24 by a distance d2 of preferably 4 feet. Separation of the device 30 from surrounding soil 24 is not necessary, but in practice such soil removal improves the performance of the device 30. Removal of subsurface soil to leave an exposed area of distance d2 between the bottom of the device 30 and the soil layer 24 enables debris to flush out of the apparatus 30 through the force of water moving through pipe 10. In contrast, if the present invention is constructed such that a layer of soil abuts the bottom of the device 30, it may be possible for debris to collect against the bottom of device 30 and clog it, thereby providing an opportunity for certain industrious animals such as beavers to build a dam against the end 12 of pipe 10. Whether accumulation of debris against the bottom of device 30 occurs will depend upon the particular geographic location of the device 30, since in some locations the flow of water through the device 30 may be relatively free of floating debris. However, use of soil separation of distance d2 assures that any debris placed in pipe 10 by such animals, or flowing through, will be flushed out of the device 30 onto the surrounding ground.

Another advantage of the present invention, when constructed having distance d1 of approximately 6 feet, is to ensure that elongated debris such as twigs or branches will flow through the device and out, rather than becoming trapped lengthwise or widthwise within the device 30. In the prior art tree branches, pine needles, twigs, and other elongated debris may become trapped laterally against the prior art pipe outlet protector and cannot flow through. Such laterally trapped debris ma not have enough longitudinal force to push through the trap-door-style outlet protectors of the prior art.

However, when an outlet protector of the present invention is used, a typical tree branch or twig will exit the end 12 of pipe 10 under the action of water flowing through pipe 10. The elongated orientation of bars 32, and the elongated gaps provided between pairs of bars 32, ensure that any long debris will fall through the device 30 rather than become trapped in it.

In practice, the device 30 has also been found to enable such long debris to change direction under the action of flowing water. Thus, in the event that such debris enter exits the pipe 10 laterally orientated with respect to the device 30, the elongated shape of the device 30 permits such debris to rotate under the action of flowing water and thereafter fall through the gaps between bars 32.

The present invention may be practiced otherwise than as specifically described above and may be constructed many variation on the foregoing teaching and disclosure. According, the invention should be understood to encompass all variants within the scope of the appended claims.

For example, the circular retaining bar 40 may be eliminated entirely, such that the conical cage 31 maintains its shape without interior support. Further, bars 32 of conical cage 31 may be formed with an outwardly or inwardly curved shape, such that the conical cage 31 resembles a tulip or teardrop shape with a bulge in the middle of the conical cage 31. In another alternative embodiment, every other rod 32 is formed with an outward curvature in portion 33 just forward of the mouth of the pipe 12, and alternating rods are formed with a slight inward curvature.

These features prevent debris from accumulating against the rods 32 by directing debris forward and out the device.

Other alternative constructions are contemplated. For example, the band 38 may be positioned on the pipe 10 such that a space of approximately 2 feet or more separates the band 38 from the end 12 of the pipe 10. By so constructing the device, such that the end 12 of the pipe 10 projects through the device and is contained within the rear portion of the conical cage 30, the stability of the device is increased.

Further, the rods 32 may be formed with a inward or outward curvature in portions 35 just forward of the band 38 at the point where bars 32 meet band 38. Preferably, the curvature imposed on portions 35 alternates, such that one portion 33 of a rod 32 is curved outwardly, and the portions 33 of adjacent bars 32 are curved inwardly at the same point. This alternating curvature increases the structural stability of the device and facilitates passage of material and water through the device.

I claim:

1. An outlet protector for water-carrying piping comprising:
    a substantially conical cage having an open end and an apex, said cage comprising a plurality of side-by-side, spaced-apart, rods extending from said open end to said apex, wherein said rods are welded together at said apex, and
    attaching means for attaching said open end of said cage to an outlet of the piping with said apex positioned outwardly of the outlet.

2. The outlet protector of claim 1, wherein said attaching means comprises a cylindrical band having an interior diameter substantially equal to the outer diameter of the piping.

3. The outlet protector of claim 1, wherein said rods are substantially parallel to each other adjacent said open end and taper towards each other adjacent said apex.

4. The outlet protector of claim 1, wherein said rods are approximately six inches apart at said open end.

5. The outlet protector of claim 1, wherein said cage has a length of at least approximately 3 feet between said open end and said apex, and wherein said rods have a circumference of approximately 2 ½ inches.

6. An outlet protector for water-carrying piping comprising:
    a substantially conical cage having an open end and an apex, said cage comprising a plurality of side-by-side, spaced-apart, rods extending from said open end to said apex, and said rods being substantially parallel to each other adjacent said open end and tapering towards each other adjacent said apex, wherein at least some of said rods have an outward curve adjacent said apex, and
    attaching means for attaching said open end of said cage to an outlet of the piping with said apex positioned outwardly of the outlet.

7. An outlet protector for water-carrying piping comprising:
    a substantially conical cage having an open end and an apex and comprising a plurality of side-by-side, spaced-apart rods extendings from said open end to said apex, wherein said rods are welded together at said apex, and attaching means for attaching said open end of said cage to an outlet of the piping with said apex positioned outwardly of the outlet, said attaching means comprising a cylindrical band having an interior diameter substantially equal to the outer diameter of the piping.

8. The outlet protector of claim 7, wherein said rods are substantially parallel to each other adjacent said open end and taper towards each other adjacent said apex.

9. The outlet protector of claim 7, wherein said rods are approximately six inches apart at said open end.

10. The outlet protector of claim 7, wherein said cage has a length of at least approximately 3 feet between said open end and said apex, and wherein said rods have a circumference of approximately 2½ inches.

11. An outlet protector for water-carrying piping comprising:
- a substantially conical cage having an open end and an apex and comprising a plurality of side-by-side, spaced-apart, rods extending from said open end to said apex, wherein at least some of said rods have an outward curve adjacent said apex, and
- attaching means for attaching said open end of said cage to an outlet of the piping with said apex positioned outwardly of the outlet, said attaching means comprising a cylindrical band having an interior diameter substantially equal to the outer diameter of the piping.

* * * * *